United States Patent [19]

Shibata et al.

[11] 4,402,559
[45] Sep. 6, 1983

[54] COOLING DEVICE FOR A BEARING MEANS

[75] Inventors: Souichi Shibata, Matsuto; Hitoshi Inoue, Miki; Kenji Katazawa, Toyama, all of Japan

[73] Assignee: Mitsubishi Denki Kabushiki Kaisha, Tokyo, Japan

[21] Appl. No.: 309,494

[22] Filed: Oct. 6, 1981

[30] Foreign Application Priority Data

Oct. 30, 1980 [JP] Japan ............................. 55-153287

[51] Int. Cl.³ .............................................. F16C 37/00
[52] U.S. Cl. ................................ 308/189 R; 384/320; 384/321; 384/900
[58] Field of Search ....... 308/77, 76, 189 R, DIG. 14, 308/207 R; 384/313, 316, 317, 319, 321, 320, 900; 165/104.21, 104.11

[56] References Cited

U.S. PATENT DOCUMENTS

| 2,352,206 | 6/1944 | Kendall | 308/77 |
| 2,512,361 | 6/1950 | Mercier | 308/77 |
| 2,829,286 | 4/1958 | Britz | 308/77 |
| 3,962,529 | 6/1976 | Kubo | 165/104.21 X |
| 4,175,800 | 11/1979 | Chaffee et al. | 308/77 |

FOREIGN PATENT DOCUMENTS 52-50438  4/1977  Japan ..................................... 308/77

Primary Examiner—John M. Jillions
Assistant Examiner—Thomas R. Hannon
Attorney, Agent, or Firm—Wenderoth, Lind & Ponack

[57] ABSTRACT

A cooling device for a bearing, including a bearing support for supporting a bearing in position and having a hollow annular chamber therewithin and extending along substantially the entire dimension of the bearing support parallel to the bearing, a refrigerant type fluid substantially filling the hollow chamber and having a vaporization temperature in the range of the temperature to which the bearing is heated during use, a heat radiator spaced from the bearing support, and a vapor pipe extending from the top of the hollow chamber to the heat radiator and a liquid pipe extending from the heat radiator to the bottom of the hollow chamber.

2 Claims, 2 Drawing Figures

COOLING DEVICE FOR A BEARING MEANS

BACKGROUND OF THE INVENTION

This invention relates to a bearing means and more particularly to a cooling device for a bearing means.

One such cooling device for a bearing means of this kind, such as for a machine tool which, publicly known is shown in FIG. 1 of the attached drawings. In FIG. 1 the reference numeral 1 designates the main shaft of a machine tool, which is journalled in bearings 2 such as ball bearings in a front bearing support 3 and a rear bearing support 4, and the shaft 1 being driven by a pulley 5 driven externally through belts by an electric motor (not shown). The machine tool has frame 6 on which are mounted main shaft 1, bearings 2, bearing supports 3 and 4, and pulley 5, frame 6 being mounted on a bed 7 together with the machine parts 1 to 5 as above mentioned.

The operation of the machine tool comprising these elements is as follows:

The torque transmitted to pulley 5 through the belts from the electric motor rotates main shaft 1. In this case bearings 2 disposed between main shaft 1 and front and rear bearing supports 3 and 4 are for the purpose of maintaining a smooth rotation of main shaft 1, but they inevitably generate heat due to rolling friction, as a result of which bearing supports 3 and 4 have their temperature raised by heat conveyed from bearings 2 so that they are subject to various deformations and strains. Consequently, the center line of main shaft 1 of the machine tool may displace in the vertical, horizontal or axial directions as the case may be, reducing the machining accuracy of a workpiece being machined by the machine tool.

SUMMARY OF THE INVENTION

It is a main object of the present invention to provide a cooling device for a bearing means which can overcome the problems in a conventional bearing means due to heat as generated during its operation.

It is another object of the present invention to provide a cooling device for a bearing means which when used in a machine tool makes it possible to rapidly remove heat generated in a main shaft during its operation.

It is a further object of the present invention to provide a cooling device for a bearing means which when used in a machine tool can reduce the deformation and strain of bearing parts as caused by heat generation owing to the rotation of the main shaft, thereby, improving the machining accuracy of the machine tool.

In accordance with the present invention a cooling device for a bearing means is provided wherein a bearing support means adapted to secure the bearing means in position has a hollow chamber therein, the hollow chamber being filled with a working fluid, such as ammonia, fluorocarbon, etc. and a radiating means is provided in fluid communication with the hollow chamber through a pair of pipes, whereby the working medium within the hollow chamber is evaporated by heat in the bearing support means transmitted thereto from the bearing means, thereby cooling the bearing means by the latent heat of evaporation of the working medium, and the evaporated working medium is moved to the radiating means to be cooled and condensed, the condensed working medium being recycled.

BRIEF DESCRIPTION OF THE DRAWINGS

These and other objects, features, and advantages of the present invention will be more fully understood by reference to the following description of the presently preferred, but nonetheless illustrative embodiment of the present invention, when taken in conjunction with the accompanying drawings, wherein.

DESCRIPTION OF THE PREFERRED EMBODIMENT

Figure 1:
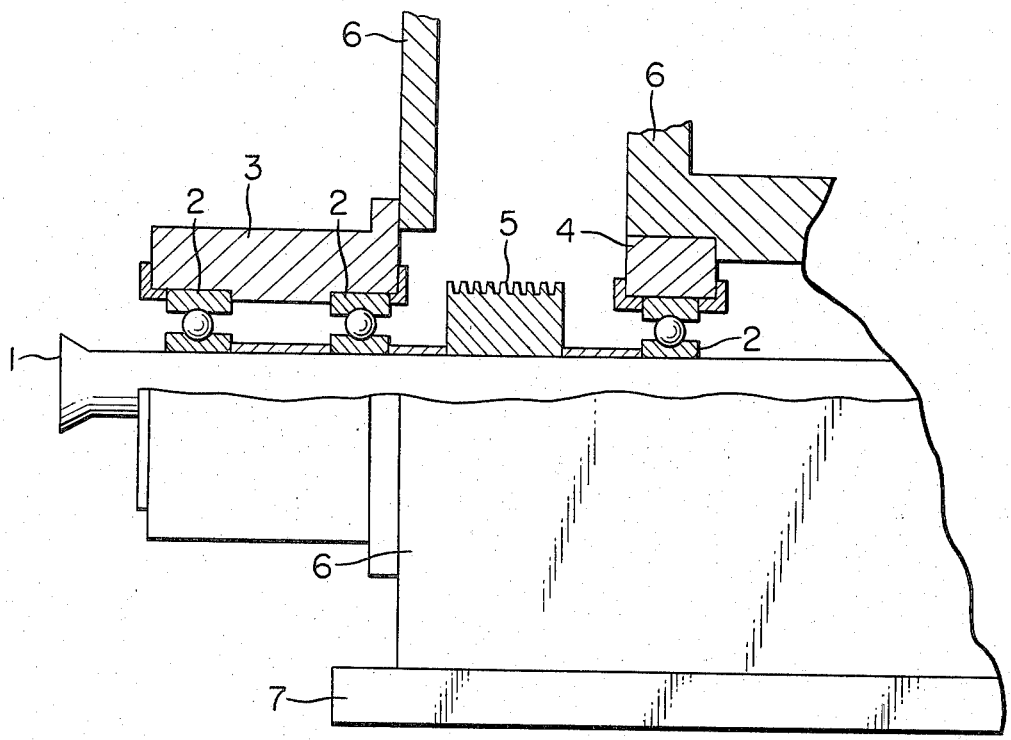
FIG. 1 is a partial sectional view of a bearing portion of a conventional machine tool.
Figure 2:
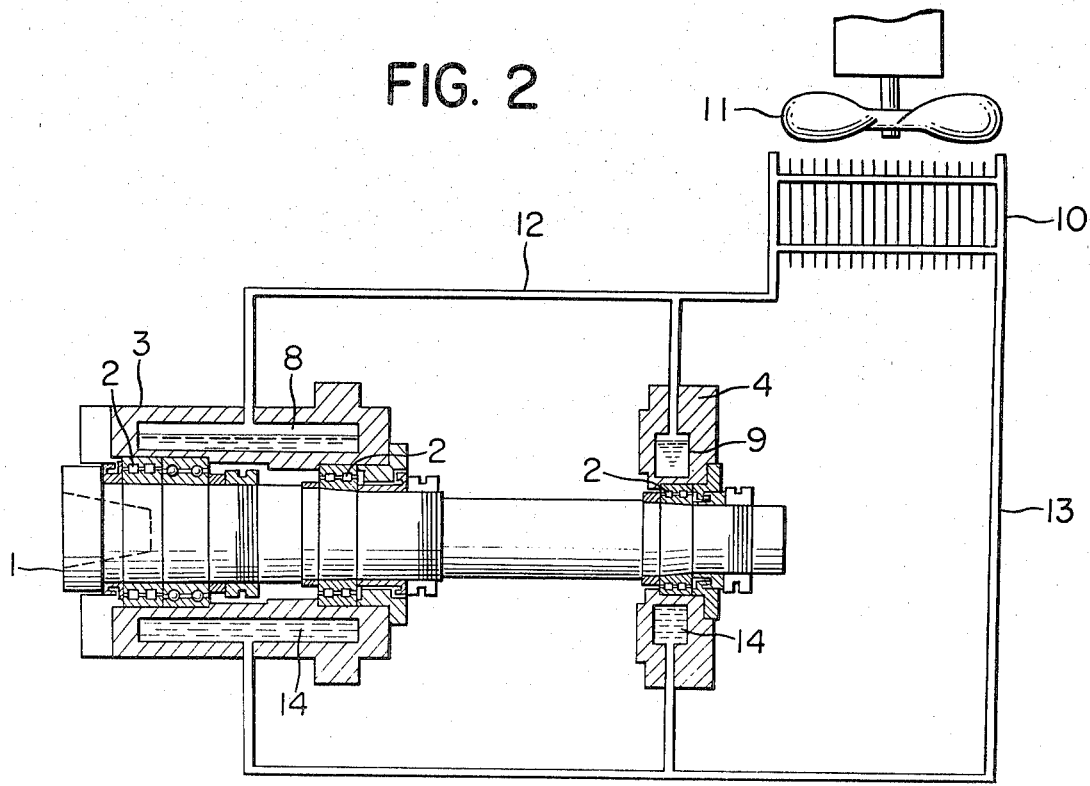
FIG. 2 is a longitudinal sectional view of a preferred embodiment of the cooling device for a bearing means in accordance with the present invention.

Referring now to FIG. 2 of the attached drawings, the reference numerals 1, 2, 3 and 4 denote a main shaft, bearings, a front bearing support, and a rear bearing support, respectively, each generally corresponding to those shown in FIG. 1 with the similar reference numerals affixed thereto. Annular hollow chambers 8 and 9 are provided within front and rear bearing supports 3 and 4, respectively. A radiating means 10 is provided which is adapted to be located at any appropriate position and to be cooled by a cooling fan 11 disposed nearby. Pipes 12 and 13 connect radiating means 10 with annular hollow chambers 8 and 9 and serve as a vapor pipe and a liquid pipe, respectively. A predetermined amount of working fluid 14 such as ammonia, fluorocarbon, etc. is placed in both annular hollow chambers 8 and 9 after both chambers 8 and 9, both pipes 12 and 13, and radiating means 10 have been evacuated by any suitable procedure.

Next the operation of the cooling device for a bearing means in accordance with the present invention having the constitution as described above will be explained in reference to FIG. 2.

The heat generated in front bearing support 3 and rear bearing support 4 as the result of the rotation of main shaft 1 in the bearings 2 heats working fluid 14 in both annular hollow chambers 8 and 9, causing it to be evaporated, thereby taking up heat corresponding to the latent heat of evaporation at the time of its evaporation, and evaporated working fluid 14 in the form of vapor and due to the vapor pressure of the working fluid itself moves to radiating means 10 through vapor pipe 12, evaporated working fluid 14 being cooled in radiating means 10 by the surrounding air forced thereover by cooling fan 11, condensing to a liquid, and the latent heat of condensation is discharged to the atmosphere. Thus, it will be appreciated that the heat generated at front and rear bearing supports 3 and 4 is discharged at radiating means 10 to the atmosphere. The condensed working fluid in radiating means 10 is recycled by gravity to front and rear bearing supports 3 and 4 through liquid pipe 13.

From the foregoing, it will be apparent that, in accordance with the present invention, the provision of an annular hollow chamber within a bearing support means containing a predetermined quantity of a working fluid therein and a radiating means connected to the hollow chamber by a pair of pipes makes it possible to rapidly and effectively remove the heat generated in the bearing through the bearing support on which the bearing is mounted by the evaporation of the working fluid. Therefore, when the present invention is embodied in bearings for e.g. a machine tool, the bearings which rotatively support the main shaft are always kept at a lower temperature so that thermal distortion or strain on the main shaft due to the heat generation in the bearings is effectively suppressed, improving the machining accuracy of the machine tool.

Although the present invention has been described above in reference to its single preferred embodiment shown in FIG. 2, it would be understood that the present invention is not limited thereto, instead it may be subjected to various changes and modifications without departing from the scope of the invention.

What is claimed is:

1. A cooling device for a bearing means comprising:
    a bearing support means for supporting a bearing means in position and having a hollow annular chamber therewithin and extending along substantially the entire dimension of said bearing support means parallel to said bearing means;
    a refrigerant type fluid substantially filling said hollow chamber and having a vaporization temperature in the range of the temperature to which said bearing means is heated during use;
    a heat radiating means spaced from and above the level of said bearing support means; and
    a vapor pipe means extending from the top of said hollow chamber to said heat radiating means and a liquid pipe means extending from said heat radiating means to the bottom of said hollow chamber, whereby said refrigerant type fluid circulates through said cooling device without the need for a separate energy source for producing such circulation.

2. A cooling device as claimed in claim 1 wherein said bearing support means comprises a plurality of bearing supports each having a hollow chamber therein, and said vapor pipe means comprises vapor pipes connected in parallel between the tops of the respective hollow chambers and said heat radiating means, and said liquid pipe means comprises liquid pipes connected in parallel between the heat radiating means and the bottoms of the respective hollow chambers.

* * * * *